(12) United States Patent
Block et al.

(10) Patent No.: US 8,494,862 B2
(45) Date of Patent: Jul. 23, 2013

(54) METHOD FOR TRIGGERING AT LEAST ONE FIRST AND SECOND BACKGROUND APPLICATION VIA A UNIVERSAL LANGUAGE DIALOG SYSTEM

(75) Inventors: Hans-Ulrich Block, Munich (DE); Rudolph Caspari, Eichenau (DE); Dongyi Song, Munich (DE); Jürgen Totzke, Poing (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 931 days.

(21) Appl. No.: 12/086,402

(22) PCT Filed: Nov. 9, 2006

(86) PCT No.: PCT/EP2006/068288
§ 371 (c)(1),
(2), (4) Date: Nov. 4, 2009

(87) PCT Pub. No.: WO2007/073977
PCT Pub. Date: Jul. 5, 2007

(65) Prior Publication Data
US 2010/0042400 A1    Feb. 18, 2010

(30) Foreign Application Priority Data
Dec. 21, 2005    (DE) .................... 10 2005 061 365

(51) Int. Cl.
*G10L 11/00* (2006.01)
*G10L 21/00* (2006.01)
(52) U.S. Cl.
USPC .................. 704/275; 704/270; 704/270.1

(58) Field of Classification Search
USPC .................................. 704/270–275
See application file for complete search history.

(56) References Cited

U.S. PATENT DOCUMENTS

| 5,479,491 A | * | 12/1995 | Herrero Garcia et al. . 379/88.15 |
| 5,748,974 A | | 5/1998 | Johnson |
| 5,799,273 A | * | 8/1998 | Mitchell et al. ............... 704/235 |
| 6,133,904 A | * | 10/2000 | Tzirkel-Hancock .......... 345/589 |
| 6,199,044 B1 | * | 3/2001 | Ackley et al. .................. 704/275 |
| 6,233,559 B1 | * | 5/2001 | Balakrishnan ................ 704/275 |
| 6,233,561 B1 | * | 5/2001 | Junqua et al. .................. 704/277 |
| 6,246,981 B1 | * | 6/2001 | Papineni et al. .............. 704/235 |

(Continued)

FOREIGN PATENT DOCUMENTS

| DE | 19615693 C1 | 12/1997 |
| EP | 0 996 072 A1 | 4/2000 |

(Continued)

*Primary Examiner* — Eric Yen
(74) *Attorney, Agent, or Firm* — Buchanan Ingersoll & Rooney PC (57) ABSTRACT

At least one transaction and at least one transaction parameter that is allocated thereto are determined based on at least one user statement in order to trigger at least one first and second background application via a universal language dialogue system, first transactions and first transaction parameters being assigned to the first background application and second transactions and second transaction parameters being associated with the second background application. The first and second transactions as well as the first and second transaction parameters are linked together via a universal dialogue specification which is evaluated to determine the at least one transaction and at least on associated transaction parameter in order to trigger at least one of the background application via the universal language dialogue system.

14 Claims, 3 Drawing Sheets

U.S. PATENT DOCUMENTS

| | | | |
|---|---|---|---|
| 6,615,177 B1* | 9/2003 | Rapp et al. | 704/277 |
| 6,910,003 B1* | 6/2005 | Arnold et al. | 704/4 |
| 6,934,675 B2* | 8/2005 | Glinski et al. | 704/9 |
| 6,978,238 B2* | 12/2005 | Wohlsen et al. | 704/246 |
| 6,996,531 B2* | 2/2006 | Korall et al. | 704/270 |
| 7,013,275 B2* | 3/2006 | Arnold et al. | 704/244 |
| 7,110,952 B2* | 9/2006 | Kursh | 704/270.1 |
| 7,137,126 B1* | 11/2006 | Coffman et al. | 719/328 |
| 7,139,713 B2* | 11/2006 | Falcon et al. | 704/270 |
| 7,143,041 B2* | 11/2006 | Sacks et al. | 704/270 |
| 7,197,460 B1* | 3/2007 | Gupta et al. | 704/270.1 |
| 7,286,989 B1* | 10/2007 | Niedermair et al. | 704/275 |
| 7,418,382 B1* | 8/2008 | Maes | 704/236 |
| 7,421,390 B2* | 9/2008 | Simpson | 704/270 |
| 7,437,295 B2* | 10/2008 | Pitts et al. | 704/275 |
| 7,487,440 B2* | 2/2009 | Gergic et al. | 715/234 |
| 7,522,055 B2* | 4/2009 | Carrender et al. | 340/572.1 |
| 7,546,382 B2* | 6/2009 | Healey et al. | 709/246 |
| 7,680,867 B2* | 3/2010 | Green et al. | 707/811 |
| 7,865,357 B2* | 1/2011 | Acero et al. | 704/9 |
| 2002/0038213 A1* | 3/2002 | Adachi | 704/257 |
| 2002/0161587 A1* | 10/2002 | Pitts et al. | 704/276 |
| 2002/0198719 A1* | 12/2002 | Gergic et al. | 704/270.1 |
| 2003/0027602 A1* | 2/2003 | Han et al. | 455/566 |
| 2003/0078782 A1* | 4/2003 | Blair | 704/270.1 |
| 2003/0171928 A1* | 9/2003 | Falcon et al. | 704/275 |
| 2004/0078201 A1* | 4/2004 | Porter et al. | 704/275 |
| 2004/0153305 A1* | 8/2004 | Enescu et al. | 704/2 |
| 2005/0203747 A1* | 9/2005 | Lecoeuche | 704/270.1 |
| 2006/0271351 A1* | 11/2006 | Mirkovic et al. | 704/4 |
| 2007/0033005 A1* | 2/2007 | Cristo et al. | 704/9 |

FOREIGN PATENT DOCUMENTS

| | | |
|---|---|---|
| EP | 1 045 374 A1 | 10/2000 |
| WO | 03001781 A1 | 1/2003 |
| WO | WO 2006/016307 A1 | 2/2006 |

* cited by examiner

METHOD FOR TRIGGERING AT LEAST ONE FIRST AND SECOND BACKGROUND APPLICATION VIA A UNIVERSAL LANGUAGE DIALOG SYSTEM

CROSS REFERENCE TO RELATED APPLICATIONS

This application is the US National Stage of International Application No. PCT/EP2006/068288, filed Nov. 9, 2006 and claims the benefit thereof. The International Application claims the benefits of German application No. 10 2005 061 365.9 DE filed Dec. 21, 2005, both of the applications are incorporated by reference herein in their entirety.

FIELD OF INVENTION

The invention relates to a method for triggering at least one first and second background application via a universal language dialog system.

BACKGROUND OF INVENTION

Language dialog systems for accessing databases, that enable information to be accessed and communication applications to be controlled, are known as interfaces to computer-supported applications. Background applications, such as, for example, a telephone information system (train, flight, movie theater etc.) or a computer-supported transaction system (home banking, on-line shopping) can increasingly be operated by using language dialog systems as access systems—known as user interfaces—which, for example, may be implemented in the form of hardware, software, or a combination of the two.

The dialog sequence for generating application-specific dialog objectives is controlled in these systems via the language dialog system, which manages interactions between a dialog management unit and the user in question. Information is input and output therein via an input unit and an output unit, which are connected to the dialog management unit.

For example, a user statement generated by a user is captured via the input unit in the form of a voice signal and processed in the dialog management unit. The input unit, for example, is connected to a voice recognition unit via which action information contained in the captured user statements is determined. In order for so-called action or information prompts to be output, i.e. preferably voice-based instructions or information to the user, the output unit may comprise a voice synthesizer and a unit for converting text to speech.

Action information from the voice signal is obtained, for example, in the form of individual words or phrases, by means of the voice recognition unit provided in the dialog management unit. Said action information is analyzed by comparison with keywords or grammars loaded in a parser unit. Depending on the result of the analysis, a transaction assigned to one of the keywords is started in order to operate the allocated background application. Depending on the identified transaction, a dialog with the respective user is started via the dialog management unit in order to control the associated background application, and the transaction parameters necessary in order to execute the required background application are thereby determined.

Three main approaches are known in the prior art in order to implement a language dialog system of this type. These are the "finite-state-based", the "frame-based" and the "agent-based" approach. The "frame-based" approach is currently the most widely used in practice. It uses a frame-based structure, which has a more flexible design, particularly by comparison with language dialog systems based on hierarchical tree structures. A transaction is modeled by means of a frame, which, for example, has a number of gaps that are filled by allocation of individual transaction parameters for the purpose of triggering the planned background application.

A background application in this context means a finite quantity of transactions wherein each transaction is assigned a finite quantity of transaction parameters. The transaction parameters are known to the language dialog system and are captured by interaction with the user via a grammar provided specifically for the individual transaction parameters. Here the user may or may not for example specify the required transaction and the assigned transaction parameters in a sentence. In the first instance the transaction can be executed immediately, and in the second instance the as yet unknown parameters still need to be captured by interaction with the user. If no transaction can be clearly determined by means of the user statement, the system automatically runs a clarification dialog in order to determine the required transaction. The same applies to unclear and incomplete user information with regard to a transaction parameter.

Each background application is assigned a dialog specification, which comprises a transaction database, a parameter database and a grammar database. Each individual background application is executed respectively by an assigned language dialog system with analysis of the dialog specification assigned in each case, i.e. in order to execute two different background applications, e.g. an "e-mail" background application and a "voice mail" background application, two dialog systems are thus required, which are called in order to trigger the irrespective background applications separately from one another with analysis of the different dialog specifications.

SUMMARY OF INVENTION

From the user's perspective, however, it is desirable for the user-friendliness of such language dialog systems to be increased such that several different background applications may be operated universally via a common language dialog system.

The object of the present invention is therefore to specify a method for triggering at least one first and one second background application via a universal language dialog system, in which several background applications may be operated together via the universal language dialog system by means of a reduced quantity of user statements. The object is achieved on the basis of the features described in the preamble to claim 1 by means of its characterizing features.

The main idea behind the inventive method is that the first and second transactions and the first and second transaction parameters are linked to one another via a universal dialog specification and, for the purpose of determining at least one transaction and at least one associated transaction parameter for triggering at least one first and second background application, the universal dialog specification is analyzed via the universal language dialog system. This advantageously enables a number of background applications to be triggered via a single "universal" language dialog system, thereby significantly increasing ease of use. To this end both functional matches between the individual transactions of the background applications to be triggered and semantic matches between their transaction parameters are determined and a standard universal dialog specification, which can be executed via a universal language dialog system, is formed on this basis.

In particular, the universal dialog specification may be formed declaratively, thus enabling it to be used with versatility and platform independence in a great variety of language dialog systems.

BRIEF DESCRIPTION OF THE DRAWINGS

Other advantageous embodiments of the inventive method, in particular a universal language dialog system for executing the method, may be derived from the further claims.

The present invention is described in more detail below by means of an exemplary embodiment with the aid of Figures, in which.

DETAILED DESCRIPTION OF INVENTION

Figure 1:
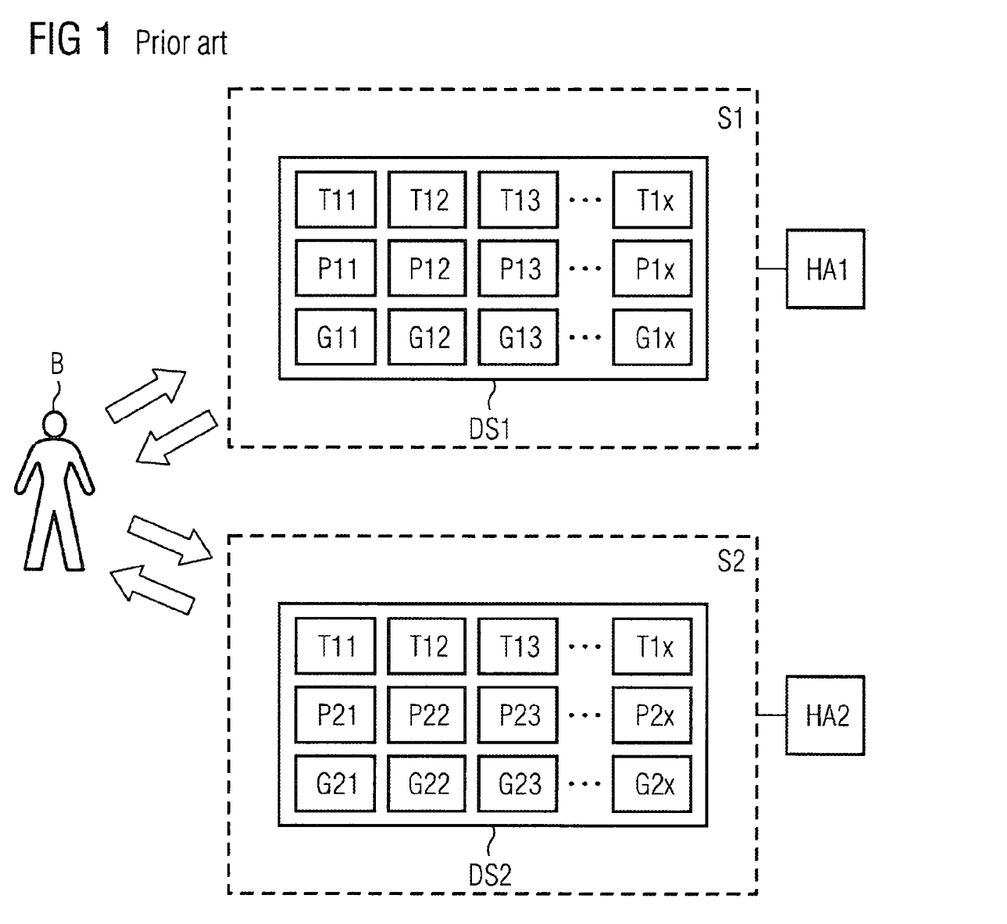
FIG. 1 shows a schematic block diagram showing of an example of two language dialog systems for triggering two different background applications.

FIG. 1 shows a schematic block diagram of a first and second language dialog system S1, S2 for triggering a first and second background application HA1, HA2 according to the prior art. The first and second background applications HA1, HA2 are operated separately from one another via their respectively assigned first or second language dialog system S1, S2, which may be technically implemented in different forms.

The transactions T11-T1X, T21-T2X, transaction parameters P11-P1X, P21-P2X and associated grammars G11-G1$x$, G21-G2$x$, which are provided for triggering the first or second background application HA1, HA2, are determined on an application-specific basis via the first and second language dialog systems S1, S2 respectively, with analysis of a first or second dialog specification DS1, DS2 by interaction with a user B. In this context, for example, a transaction T11 may be assigned one or more grammars G11 and one or more transaction parameters P11, wherein a grammar G11 comprises the parameter values that may be allocated respectively to a transaction parameter P11.

Figure 2:
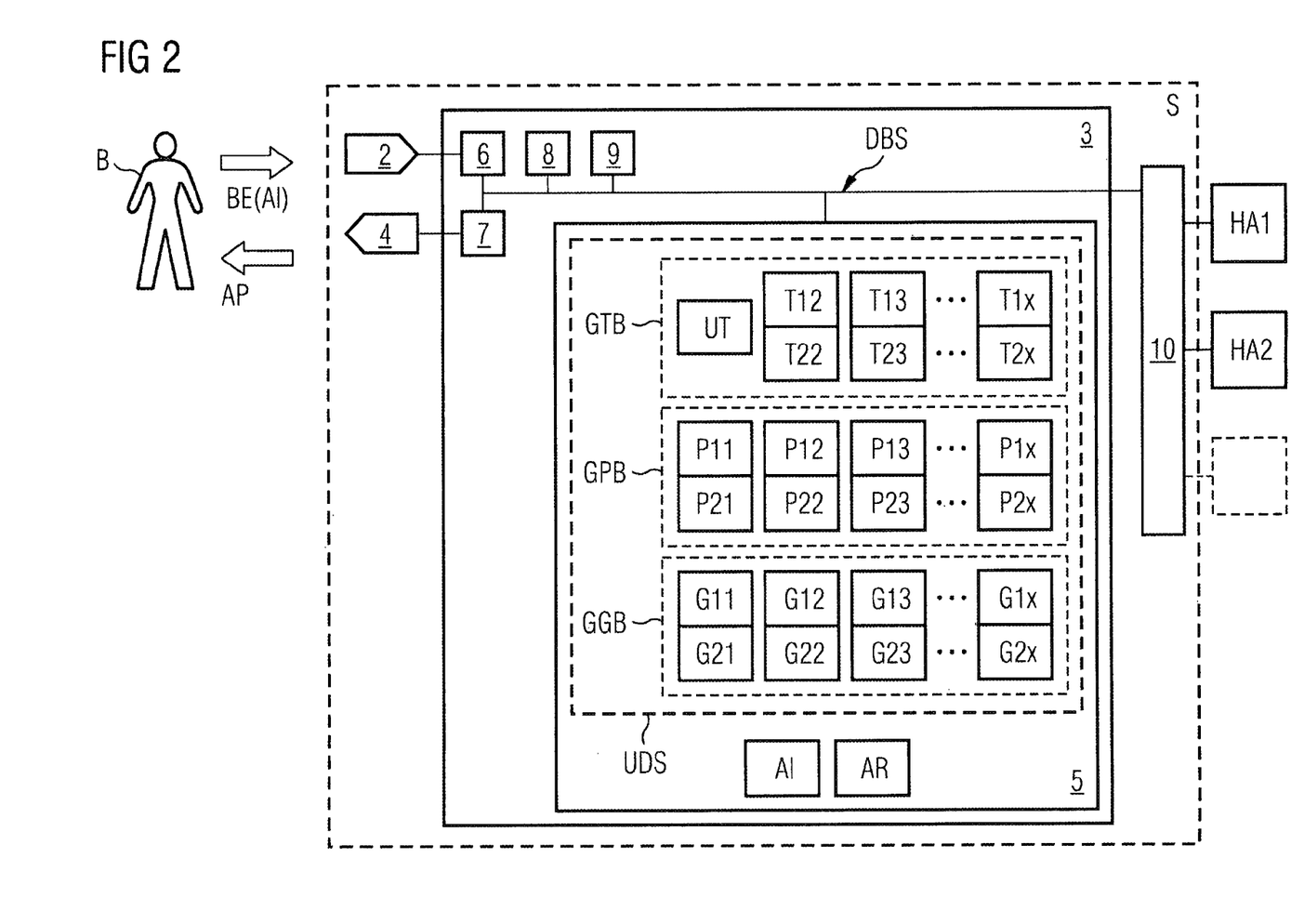
FIG. 2 shows a further schematic block diagram of an example of the inventive universal language dialog system for triggering two different background applications.

In contrast to this, the inventive universal language dialog system 1 shown by way of example in FIG. 2 comprises a universal dialog specification UDS, which, by means of the evaluation it carries out, enables a user B in dialog with the universal language dialog system 1 to operate at least a first and second background application HA1, HA2 together. The first and second background applications HA1, HA2 are, in turn, operated by way of example on the basis of transactions T11-T1X, T21-T2X, associated transaction parameters P11-P1X, P21-P2X, and grammars G11-G1$x$, G21-G2$x$ which have been determined individually are stored in the universal language dialog system 1.

The language dialog system 1 shown in FIG. 2 further comprises an input unit 2, a dialog management unit 3 and an output unit 4, wherein the dialog management unit 3 is connected in each instance to the input unit 2, the output unit 4 and the first and second background application HA1, HA2 via an interface unit 10 ("integration layer").

A storage unit 5 is provided in the dialog management unit 3 for storage of the individual transactions T11-T1X, T21-T2X, the transaction parameters P11-P1X, P21-P2X, the grammars G11-G1$x$, G21-G2$x$ and further parameters. The dialog management unit 3 comprises a voice recognition unit 6, a voice synthesizer 7, a parser unit 8 and a control unit 9, which, for example, are connected to the interface unit 10 via a data bus system DBS. The first and second, and possibly further, background applications HA1, HA2 are likewise connected to the data bus system DBS via the interface unit 10. The input unit 2 of the language dialog system 1 is connected to the voice recognition unit 6 and the output unit 4 is connected to the voice synthesizer 7.

A user statement BE comprising action information AI is generated by the user B in the context of a user dialog for operating or triggering the first and/or second background application HA1, HA2. This user statement BE may comprise one or more pieces of action information AI, which may be arranged in different sequences within the user statement BE.

A user statement BE of the user B is captured via the input unit 2 and processed further in the dialog management unit 3 by means of an analysis routine AR executed in the control unit 9. For example, the user statement BE is stored in digitized form in the storage unit 5 and/or the action information (one or more) AI contained in the user statement BE, said action information being stored in the storage unit 5, is determined via the voice recognition unit 6 in ways that are known per se.

In addition, output prompts or information prompts AP are made available to the user B via the output unit 4, said prompts being output for example in the form of a voice signal generated by the voice synthesizer 7 via the output unit 4. This enables the user B, for example, to be informed about the current status of the first or second background application HA1, HA2 to be operated, or the actions executed by the language dialog system 1 as a result of the last user statement BE. The user B may also be prompted for at least one further user statement BE by the outputting of information prompts AP, i.e. a clarification dialog which alternates between output and information prompts AP and user statements BE is carried out between the user B and the language dialog systems 1.

In order to trigger at least two different background applications HA1, HA2 via the universal language dialog system 1, the transactions T11-T1X, T21-T2X of the first or second background application HA1, HA2 are linked together and stored in a common transaction parameter base GTB. In a similar way the transaction parameters P11-P1X, P21-P2X of the transactions T11-T1X, T21-T2X are linked together and stored in a common transaction parameter base GTB. The grammars G11-G1X, G21-G2X assigned to the respective transactions T11-T1X, T21-T2X are likewise assigned to a common grammar database GGB.

In this connection, controlled via an analysis routine carried out in the control unit 9 AR, at least the transactions T11-T1X, T21-T2X and the transaction parameters P11-P1X, P21-P2X are linked to one another so that they can be analyzed via the universal language dialog systems 1 in the form of a universal dialog specification UDS for joint triggering of the first and second background applications HA1, HA2. The grammars G11-G1$z$, G21-G2$x$ assigned to the individual transactions T11-T1X, T21-T2X may continue to be used with virtually no modifications.

In a particularly advantageous embodiment, the universal dialog specification UDS is formed declaratively, i.e. even though the dialog objectives of the clarification dialog are preset via the universal dialog specification UDS, the dialog to be carried out to achieve the dialog objectives nevertheless remains open.

For the purpose of linking the first and second dialog specifications S1, S2, there are essentially three different scenarios which will be explained in greater detail below.

The first scenario concerns those background applications HA1, HA2, in which neither the transactions T11-T1X, T21-T2X of the background applications HA1, HA2 contain functional matches, nor do the transaction parameters P11-P1X, P21-P2X assigned thereto contain semantic matches. The first and second background applications HA1, HA2 are thus formed quite differently from one another in terms of function and semantics. The transactions T11-T1X, T21-T2X and the assigned transaction parameters P11-P1X, P21-P2X are linked, in order to generate the universal dialog specification UDS, in such a way that they can be evaluated via the universal language dialog system 1, i.e. the corresponding functions of the first and second background application HA1, HA2 can be operated consecutively via a common user interface.

The second scenario comprises those background applications HA1, HA2, that comprise at least the functionally corresponding transactions T11, T21, via which the same function is triggered in both background applications HA1, HA2. In order to increase the ease of use of the universal language dialog system 1, functional matches are determined, via the control routines executed in the control unit 9, between the transactions T11-T1X assigned to the first background application HA1, and the transactions T21-T2X assigned to the second background application HA1, and these are linked to one another to facilitate the common triggering of the functionally corresponding transactions T11-T1X, T21-T2X. This linking of two transactions T11, T21 causes, for example, the creation of a new universal transaction UT, which is stored in the universal dialog specification UDS instead of the transactions T11, T21.

For example, a background application "e-mail" and a background application "voice mail" each comprise an address book function with an assigned transaction "search contacts". The functionally corresponding transaction "search contacts" in the two background applications "e-mail" and "voice mail" is detected by the analysis routine AR and one of the two "search contacts" transactions is linked with both background applications "e-mail" and "voice mail" as a universal "search contacts" transaction for common triggering of the background applications "e-mail" and "voice mail" in the universal dialog specification UDS. If, for example, the telephone number of the contact person "Robert" is called up by the user B via one of the two background applications "e-mail" or "voice mail", then this takes place in both background applications HA1, HA2 by means of the universal "search contacts" transaction specified in the universal dialog specification UDS. In this case it is completely irrelevant to the user B which of the original "search contacts" transactions of the background applications "e-mail" or "voice mail" delivers the required result, namely the telephone number of "Robert".

According to a third scenario, semantically corresponding transaction parameters P11-P1X, P21-P2X of the first background application HA1 and of the second background application HA2 are determined respectively via the analysis routine AR executed in the control unit 9 and these are linked together in the event of a semantic match, so that, for example, action information AI already received from the user B by means of a clarification dialog or through direct user statement BE may be reused for the execution of at least one further transaction, i.e. transaction parameters P11-P1X, P21-P2X that are semantically associated with one another are advantageously linked to one another, in order to reduce the number of user statements BE that need to be expended by the user B in order to trigger a further background application HA2. This enables repeated inputs of information by the user B to be avoided in the course of the clarification dialog.

For example, the background application "hotel" and the background application "flight" comprise semantic matches of the transaction parameters P11-P1X, P21-P2X which can be assigned to the transaction "hotel reservation" and the transaction "flight reservation". It may normally be assumed that the transaction parameters "departure date" and "arrival time" in the transaction "flight reservation" correspond to the transaction parameters "arrival date" and "arrival time" in the transaction "hotel reservation", or are likely to be related to one another. By reusing semantically corresponding transaction parameters P11-P1X, P21-P2X, information already obtained during execution of the clarification dialog with the user B for the triggering of the background application "hotel reservation" may be reused in the context of the clarification dialog for triggering the background application "flight reservation", whereby—owing to the saving in user statements BE, the entire universal language dialog system 1 becomes significantly more user friendly.

In a further exemplary embodiment, two background applications, namely the background application "light control" and the background application "wake-up call" are triggered via a universal language dialog system 1 by means of a universal dialog specification UDS. These background applications "light control" and "wake-up call", however, do not have any functional or semantic matches whatsoever, i.e. they are "disjunct" from one another. The individual transactions and transaction parameters of both background applications "light control" and "wake-up call" are assigned to the joint transaction basis GTB and the transaction parameter basis GPB virtually unmodified in order to form the universal dialog specification UDS. Analysis by the universal dialog specification UDS produces, for example, the following dialog between the user B and the language dialog system 1:

System: How may I help you?
User: Please wake me at 7 o'clock.
System: You will be woken at 7 o'clock.
User: Please switch off the bedroom light.
System: The bedroom light is switched off.

This means, for example, that a further instruction to the system which, according to the prior art, would be necessary in order to trigger the further background application "light control", is no longer required.

In the previous example of the background application "hotel" and the background application "flight", for example, the transaction parameters "arrival date" and "destination" of the transaction "flight reservation" are reused by the transaction "hotel reservation", particularly if an adapted action prompt AP is also generated. A thus improved user dialog between the user B and the universal language dialog system 1 may read as follows:

System: How may I help you?
User: I wish to fly from Munich to Berlin at around 10 o'clock tomorrow morning.
System: Flight 731 from Munich to Berlin leaves tomorrow, 14 Sep. 2005 at 10 o'clock. Do you wish to take this flight?
User: Yes
System: Your ticket has been booked.
User: I wish to make a hotel booking.
System: Do you want to make a hotel booking on 14 September in Berlin?
User: Yes, at the Hotel "Mercure"
System: A room has been booked for you at the Hotel "Mercure" for the night of 14 to 15 September.

Figure 3:
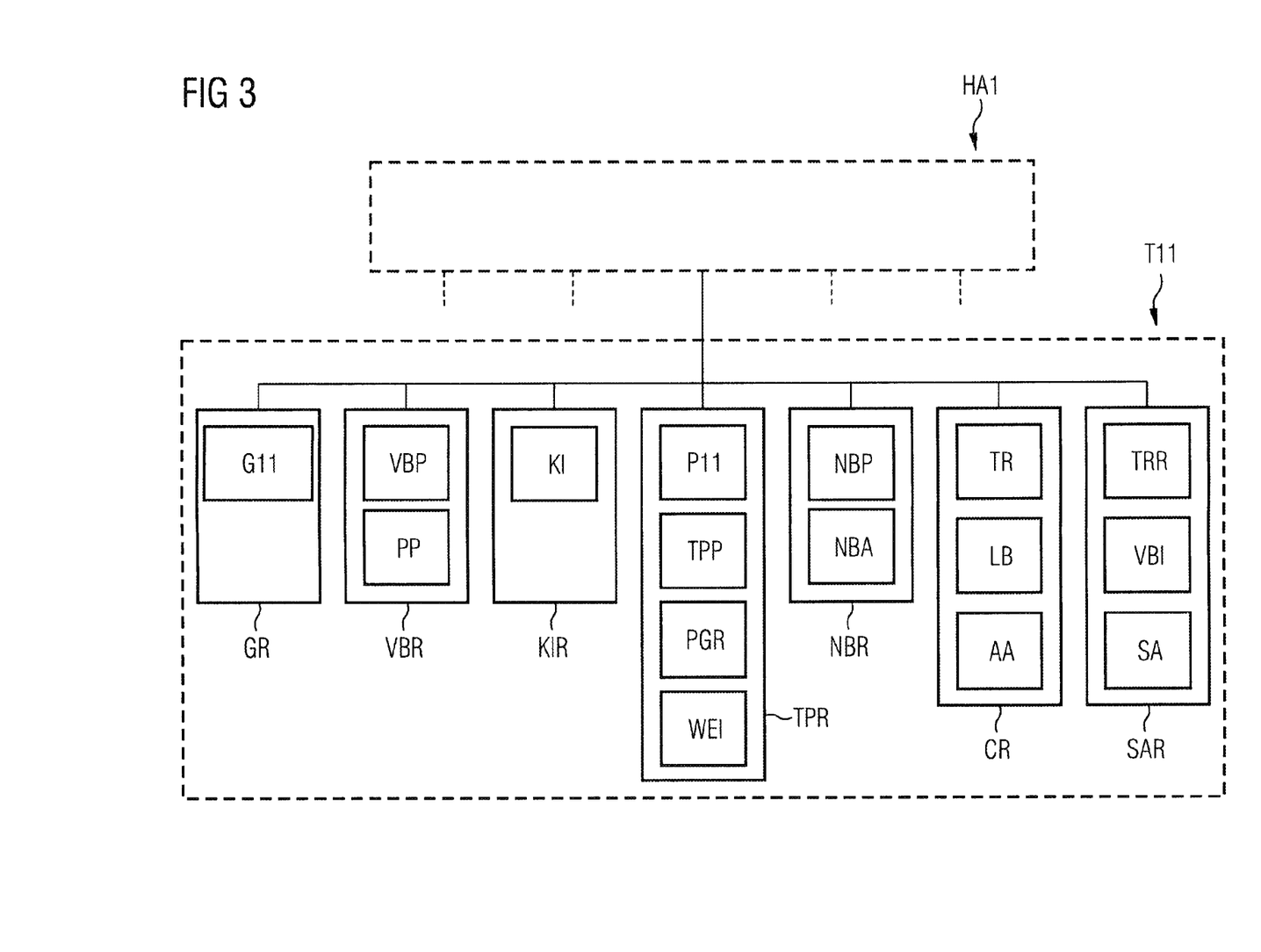
FIG. 3 shows a further schematic block diagram of an example of the setup of a frame-based transaction for triggering a function of at least one background application.

In a preferred embodiment of the inventive method, the transactions T11-T1x, T21-T2x have the frame-based structure shown in FIG. 3 by way of an example of a first transaction T11 for the first background application HA1.

In order to increase ease of use, at least one matching piece of context information K1 is additionally assigned in the universal language dialog system 1 to the semantically associated transactions T11-T1x within a background application HA1, HA2, and for example the transactions T11, T21 which are semantically associated are combined to form a transaction group TG.

For example, a background application "Unified Messaging System" comprises a plurality of similar functions, which are triggered in a semantically associated transaction T11-T1X. The transaction "Read e-mail" and the transaction "Delete e-mail", for example, may be combined to form a transaction group "E-mail processing" by assignment of the context information KI="E-mail processing". Thus, by means of the context information KI, the context-related linking of different transactions T11-T1x of a background application HA1, HA2 is analyzed for the current determination of a transaction T1 to Tx and this significantly reduces the amount of time and computing outlay required to carry out the determination process.

When a transaction T11 is determined, the context information KI of the last transaction executed is evaluated via the control routine carried out in the control unit 9, in such a way that preference is given, during the determination process, to those transactions T12, T13 that have context information KI which corresponds to the stored context information KI. Thus those groups of transactions T11-T13 that belong to the most recently executed transaction are analyzed first for the detection of the current transaction T11. This is particularly advantageous in that it enables transactions T11-T13 belonging to a common transaction group to be prioritized in the selection procedure, and thus preference to be given to executing those transactions T11-T1X that have the highest "hit probability".

In order to check the context information KI, each transaction T11 is assigned a context information routine KIR which checks the correspondence of the context information KI of the current transaction T11 with the last transaction carried out in the dialog management unit 3. If the most recently stored context information KI corresponds to the piece of context information KI assigned to the first transaction T11, then the first transaction T11 that is taken into account is given preferential consideration in determining the current transaction, i.e. the action information AI, which is obtained from the user statement BE is analyzed via the grammatical routine GR which is executed in the parser unit 8 of the transaction T11 in question. The context information KI may, for example, have the parameter type "string", which illustrates a generic term reflecting the semantic relationship between the transactions T11 to T1X.

In addition, each transaction T11-T1x within a background application HA1, HA2 is respectively assigned a transaction parameter routine TPR, which—in addition to the determined transaction parameters P11-P1x—comprises transaction parameter prompts TPP, a parameter grammar PGR, and valuation information WEI. The content of the transaction T11 is specified by its transaction parameters P11-P1x, the values of which are determined via the transaction parameter routine TPR. In addition, the values of the transaction parameters P11-P1x are determined via the parameter grammar PGR executed in the parser unit 8 from the action information AI. The transaction parameters P11-P1x that are still to be determined in order to execute the transaction T11 are obtained by outputting the respectively assigned transaction parameter prompt TPP to the user B, and its action information AI, which is contained in a further user statement BE, in the context of a clarification dialog.

Moreover, the previously described linking on the basis of semantic correspondence between two transaction parameters P11, P21 is implemented respectively via the valuation information WEI assigned to the individual transaction parameters P11-P1X. For example, in order to determine the transaction parameters P11-P1x, in addition to carrying out a clarification dialog with the user B, the parameter values P21-P2x of one of the other transactions T21-T2x of the second background application HA2 that are already present in the universal language dialog system 1 may be evaluated.

In order to check the validity of a modified transaction parameter, a constraint routine CR is provided for each transaction T11-T1X, which comprises trigger parameters TR, logical conditions LB and action instruction prompts AA. Thus, by means of the constraint routine CR, the validity of the modified parameter value of a transaction parameter P11-P1x is determined with the help of the preset trigger parameter TR and the logical condition LB and communicated to the user B via action instruction prompts AA in the event of any deviation. For example, the logical condition LB is preset as being to add two transaction parameters P1, P2 and to check whether these exceed an upper threshold value $P_{max}$ for example. If the upper threshold value $P_{max}$ is exceeded, the assigned action instruction prompt AA is output to the constraint routine CR. Alternatively, depending on the analysis of the logical condition LB, a predefined system function may also be initiated.

A post condition routine NBR checks whether all postconditions NB necessary for execution of the respective transaction T11-T1x, for example those required for execution of at least the necessary transaction parameters P11-P1X, are still present, i.e. that the gaps in the transaction T11 modeled as the frame are filled, and that the assigned function of the background application HA can still be started with the help of the selected transaction T11. Thus those postconditions NB that need to be present at the end of the dialog are checked via the postcondition routine NBR, in order to guarantee the transfer of all information necessary for operation of the background application HA via the transaction T11. The postcondition routine NBR may be used advantageously to individually define and check postconditions NB of varying complexity for different transactions T11-T1X.

Finally, the transaction T11 comprises a system action routine SAR, which is used for converting the output from specific action prompts AP or system actions SA. For this purpose, the system action routine SAR comprises—for example—system trigger parameters TRP and precondition information VBI as well as preset system actions SA. If there is a change to the system trigger parameters TRP, the initiation of the preset system actions SA is verified via the precondition information VBI and the assigned system actions SA are started if necessary. Thus, with the help of the system action routine SAR, the user B is informed about any change in the dialog status or in the status of the background application HA1.

In an alternative embodiment, the universal dialog specification UDS may be generated for example by means of a development routine, which, depending on the existing matches in the background applications HA1, HA2 to be triggered together, require preset parameters or manual inputs by a user. By means of development routines executed for example on a processor unit, the first dialog specification DS1 provided for triggering the first background application HA1, and the second dialog specification DS2 provided for triggering the second background application HA2, are merged into a universal, common dialog specification UDS.

In a first stage, starting from the first and second background application HA1, HA2, those transactions T11-T1x, T21-T2x that correspond functionally according to the invention are determined via the development routine. All possible functional or semantic matches are determined in this process, and these are compared with reference parameters preset by the user and, as a function of the result, the respective link is set up between the determined functionally corresponding transactions T11-T1X, T21-T2X or semantically corresponding transaction parameters P11-P1X, P21-P2X. To this end, all successive transactions T11-T1X, T21-T2X and/or transaction parameters P11-P1X, P21-P2X are processed separately, in their respective pairs, for the purpose of generating the universal dialog specification UDS.

In order to determine a functional match between two transactions T11, T21, for example, the grammars G11, G21 or key words assigned to the are compared. For example, the key words "booking", "reservation" etc, may be assigned to the transaction "ticket reservation" in the grammar. If corresponding key words are determined via the development routine, then there is a functional match between the observed transactions T11, T21. If not, then the two are different.

In order to link the functionally corresponding transactions T11, T21, their postcondition routines NBR are combined respectively, for example they are assigned a common postcondition routine (NBP). The transaction "login" for the background application "e-mail" and the transaction "login" for the background application "voice mail" are for example assigned a common postcondition routine NBR, which comprises adapted postcondition actions NBA, on the basis of the corresponding key words. For example, either the information prompt "You are logged into the system for the background application e-mail und voicemail" or "Your login has failed" is output as the postcondition action NBA, depending on whether at least the transaction "login" has been unsuccessful in one of the two background applications "e-mail" or "voice mail".

In a similar way, semantic matches are determined between the transaction parameters P11-P1x, P21-P2x of the different transactions T11-T1x, T21-T2x by means of the development routine. For this purpose the transaction parameter values that may be assigned by the system to a parameter P11-P1X, P21-P2x are compared from two transactions T11-T1X, T21-T2x respectively, and depending on the result of the comparison a semantic match is or is not determined between the parameters P11-P1x, P21-P2x. In a preferred embodiment at least one of the assignable parameter values of a first parameter P11 matches at least one of the assignable parameter values of a second parameter P21. Otherwise there is no semantic correspondence.

The invention was described above on the basis of an exemplary embodiment. Numerous modifications and variations are of course possible without departing from the inventive idea upon which the invention is based.

The invention claimed is:

1. A method for triggering at east one of a first background application and a second background application via a universal language dialog system, comprising:

assigning transaction parameters to the first background application and the second background application, the transaction parameters comprising at least one first transaction parameter and at least one second transaction parameter, the assignment being determined on the basis of at least one user statement for triggering at least one of the first background application and the second background application, wherein at east one first transaction and the at least one first transaction parameter is assigned to the first background application and at least one second transaction and the at least one second transaction parameter is assigned the second background application;

linking the at least one first transaction and the at least one second transaction to one another via a universal dialog specification and linking the at least one first transaction parameter and the at least one second transaction parameter to one another via the universal dialog specification; and assigning grammars to each of the at least one first transaction and the at least one second transaction;

analyzing the universal dialog specification via the universal language dialog system in order to determine whether received voice data corresponds to any of the at east one first transaction, the at least one second transaction, the at least one first transaction parameter and the at least one second transaction parameter, wherein the determination of whether the received voice data corresponds to any of the at least one first transaction the at least one second transaction, the at least one first transaction parameter and the at least one second transaction parameter is for triggering at least one of the first background application and the second background application; and wherein transactions associated with the first and second background applications that have functional matches are linked to one another via the universal dialog specification; and wherein in order to determine a functional match between two transactions, the grammars assigned to the two transactions are compared to one another and a functional correspondence between the two transactions is or is not determined depending on a result of the comparison.

2. The method as claimed in claim 1, wherein the universal dialog specification is formed declaratively.

3. The method as claimed in claim 1, wherein the first and second transactions that are linked via the universal dialog specification are stored in a common transaction database.

4. The method as claimed in 1, wherein the first and second transaction parameters that are linked via the universal dialog specification are stored in a common transaction parameter database.

5. The method as claimed in 1, wherein first grammars assigned to the first background application and second grammars assigned to the second background application are combined in a common grammar database and assigned to the universal dialog specification.

6. The method as claimed in claim 1 wherein at least one of the at least one first transaction and the at least one second transaction is assigned at least one postcondition routine.

7. The method as claimed in claim 1, wherein in order to link at least two functionally corresponding transactions, a universal transaction is formed.

8. The method as claimed in claim 1, wherein a common postcondition routine is assigned to link two functionally corresponding transactions of a universal transaction.

9. The method as claimed in claim 1 wherein transaction parameters that have semantic matches are linked to one another via the universal dialog specification.

10. A method for triggering at least one of a first background application and a second background application via a universal language dialog system comprising:

assigning transaction parameters to the first background application and the second background application, the transaction parameters comprising at least one first transaction parameter and at least one second transaction parameter, the assignment being determined on the basis of at least one user statement for triggering at least one of the first background application and the second background application, wherein at least one first transaction and the at least one first transaction parameter is assigned to the first background application and at least one second transaction and the at least one second transaction parameter is assigned the second background application;

assigning a grammar which provides parameter values that are assignable to the transaction parameters;

linking the at least one first transaction and the at least one second transaction to one another via a universal dialog specification and linking the at least one first transaction parameter and the at least one second transaction parameter to one another via the universal dialog specification; and analyzing the universal dialog specification via the universal language dialog system in order to determine whether received voice data corresponds to any of the at east one first transaction, the at least one second transaction, the at least one first transaction parameter and, the at least one second transaction parameter, wherein the determination of whether the received voice data corresponds to any of the at least one first transaction, the at least one second transaction, the at least one first transaction parameter and the at least one second transaction parameter is for triggering at least one of the first background application and the second background application; and wherein transaction parameters of the first and second background applications that have semantic matches are linked to one another via the universal dialog specification; and wherein in order to determine a semantic correspondence between two transaction parameters, parameter values assignable to the two transaction parameters which are provided in the grammar are compared with one another, and wherein depending on the result of the comparison, a semantic match between the two transaction parameters is or is not determined.

11. The method as claimed in claim 10, wherein parameter values of the transaction parameters are determined via a transaction parameter routine, wherein each of the transaction parameters is assigned valuation information that specifies a determination path.

12. The method as claimed in claim 11, wherein the valuation information specifies linking of two semantically matching transaction parameters of different transactions.

13. The method as claimed in claim 11, wherein a presence of assigned postcondition parameters is checked, and postcondition actions associated with the assigned postcondition parameters are carried out in accordance with a common postcondition routine.

14. The method as claimed in claim 10, wherein during execution of one of the at least one first transaction, a user of the universal language dialog system is shown one of information and action prompts preset for the first background application.

* * * * *